United States Patent Office 3,504,057
Patented Mar. 31, 1970

3,504,057
O,O-DIALKYL-S-ARYLOXY-ETHOXYMETHYL PHOSPHATES AND PHOSPHONATES
Llewellyn W. Fancher, Orinda, and Reed A. Gray, Saratoga, Calif., assignors to Stauffer Chemical Company, New York, N.Y., a corporation of Delaware
No Drawing. Continuation-in-part of application Ser. No. 427,500, Jan. 22, 1965. This application Sept. 11, 1967, Ser. No. 666,992
Int. Cl. C07f 9/16, 9/40; A01n 9/36
U.S. Cl. 260—951          7 Claims

ABSTRACT OF THE DISCLOSURE

Compounds corresponding to the formula

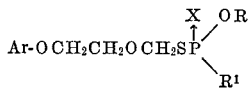

in which X is oxygen or sulfur, R is lower alkyl, $R^1$ is lower alkyl or lower alkoxy, and Ar is a nuclear polychlorinated phenyl or naphthyl. The polychlorination is from 2 to 5 chlorine atoms. The naphthyl nuclei are bonded through either the $\alpha$ or $\beta$ nuclear carbon atoms. The above compounds are effective herbicides, particularly for the control of grasses and broadleaf plants with both pre-emergence and post-emergence activity. Representative compounds are: 2,4-dichlorophenoxyethyl-oxymethyl-O,O-diethyl phosphorodithioate, $\beta$-naphthoxyethyl-oxymethyl - O,O - dimethylphosphorodithioate, 2,4,5 - trichlorophenoxyethyloxymethyl - O,O - diethylphosphorothiolate, 2,4,5 - trichlorophenoxyethyl-O-ethylmethylphosphonodithioate.

---

This application is a continuation-in-part of copending application Ser. No. 427,500, filed Jan. 22, 1965 now abandoned.

This invention relates to new herbicidally active organophosphorous compounds. More specifically, this invention relates to certain substituted aryloxyethyloxymethyl mono-, thio- and dithio-phosphates and phosphonates and to the preparation and utility of said organophosphorous compounds as herbicides.

The compounds comprising the instant class of compounds are aryloxyethyloxymethyl derivatives of alkyl substituted monothio- and dithio-phosphoric acid or phosphonic acid and correspond to the general formula

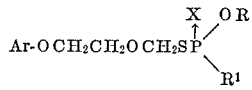

wherein X is selected from the group consisting of oxygen and sulfur, R is lower alkyl, $R^1$ is selected from the group consisting of lower alkyl and lower alkoxy and Ar is selected from the group consisting of nuclear polychlorinated-phenyl and naphthyl groups, wherein said polychlorination is from 2 to 5 chlorine atoms, inclusive. Said naphthyl nuclei are bonded through either the $\alpha$ or $\beta$ nuclear carbon atom.

It is also possible that other nuclearly substituted phenyl and naphthyl compounds are operable within the embodiments of the present invention. Said substituents are selected from the group consisting of the halogens, hydroxyl, nitro, alkoxy and alkyl groups and various combinations thereof. The method of preparation for the compounds would be substantially the same involving the appropriate substituted-alkoxy ethanol.

The compounds herein contemplated are prepared by various methods. The method applied in preparing the compounds is first the reaction of the appropriate dialkyl dithio- or monothiophosphoric or phosphonic acid and 37 percent Formalin. This is followed by the condensation of the product obtained thereby with the appropriate polychlorophenoxyethanol or $\alpha$- or $\beta$-naphthoxyethanol in the presence of a stable acid condensation catalyst, such as 2-naphthalene sulfonic acid monohydrate. The reaction proceeds readily in the liquid phase. The incorporation of an organic solvent is also useful, facilitating processing as well as agitation of the reactants. Temperatures that permit operation in the liquid phase and which are between room temperature and the reflux temperature of the solvent, if any is employed, are operable. Preferably the condensation reaction is carried out at reflux temperature.

It has been found that the compounds of the present invention are particularly effective as herbicides. They are effective in the control of grasses and broadleaf plants with both pre-emergence and post-emergence activity.

The compounds of the present invention are prepared in accordance with the following example.

EXAMPLE

Preparation of 2,4-dichlorophenoxyethoxymethyl-O,O-diethylphosphorodithioate

This example is representative of the preparation of aryloxyethoxymethyl derivatives of dialkylsubstituted dithiophosphoric acid within the embodiment of the present invention. The method is equally applicable to the preparation of monothiophosphoric acid derivatives and dithio and monothio phosphoric acid derivatives.

To 11.2 g. (0.06 M) of diethyldithiophosphoric acid is added with cooling below 15° C., 0.5 cc. (0.065 M) of 37 percent Formalin. The mixture is transferred to a separatory funnel in which there is 5 cc. of saturated aqueous sodium chloride and 75 cc. of benzene as a solvent. After thorough mixing, the layers are allowed to separate. The bottom aqueous layer is reextracted with 25 cc. of benzene. The benzene extractions are combined, dried over anhydrous magnesim sulfate and filtered.

The benzene solution of hydroxymethyl-O,O-diethyl-phosphorodithioate is placed in a reaction flask equipped with a continuous water extractor. To the reaction flask is added 10.4 g. (0.05 M) of 2,4-dichlorophenoxyethanol and 1.0 g. of 2-naphthalene sulfonic acid monohydrate. The mixture is stirred and refluxed until no further quantity of water distilled into the water collection trap. After cooling, the reaction mixture is washed several times with water, dried over anhydrous magnesium sulfate, filtered and the organic solvent removed on a steam bath. There is obtained 19.8 g. (97.7% of theory) of the title compound, a viscous liquid $n_D{}^{30}$ —1.5552.

Analysis.—calculated for $C_{13}H_{19}Cl_2O_4S_2P$ (percent): Cl, 17.5; S, 15.8; P, 7.66. Found (percent): Cl, 17.6; S, 15.2; P, 7.75.

The following is a table of the compounds which are prepared according to the aforedescribed procedure. Compound numbers have been assigned to each compound and are used for identification throughout the balance of the application.

As previously mentioned, the herein described novel compounds produced in the above described manner are phytotoxic compounds which are useful and valuable in controlling various plant species. The compounds of this invention are tested as herbicides in the following manner.

TABLE I

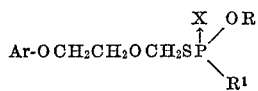

| Compound No. | R | R¹ | X | Ar | $n_d^{30}$ |
|---|---|---|---|---|---|
| 1* | Ethyl | Ethoxy | S | 2,4-dichlorophenyl | 1.5552 |
| 2 | Methyl | Methoxy | S | ....do.... | 1.5700 |
| 3 | i-Propyl | i-Propoxy | S | ....do.... | 1.5409 |
| 4 | Ethyl | Ethoxy | S | 2,4,5-trichlorophenyl | 1.5602 |
| 5 | i-Propyl | i-Propoxy | S | ....do.... | 1.5480 |
| 6 | Methyl | Methoxy | S | ....do.... | 1.5767 |
| 7 | Ethyl | Ethoxy | S | Pentachlorophenyl | 1.5738 |
| 8 | Methyl | Methoxy | S | ....do.... | 1.5888 |
| 9 | i-Propyl | i-Propoxy | S | ....do.... | 1.5555 |
| 10 | Ethyl | Ethoxy | S | β-Naphthyl | 1.6027 |
| 11 | Methyl | Methoxy | S | ....do.... | 1.6265 |
| 12 | i-Propyl | i-Propoxy | S | ....do.... | 1.5797 |
| 13 | ....do.... | ....do.... | S | α-Naphthyl | 1.5912 |
| 14 | Methyl | Methoxy | S | ....do.... | 1.6142 |
| 15 | Ethyl | Ethoxy | S | ....do.... | 1.6082 |
| 16 | ....do.... | ....do.... | O | 2,4,5-trichlorophenyl | 1.5411 |
| 17 | ....do.... | ....do.... | O | 2,4-dichlorophenyl | 1.5292 |
| 18 | Methyl | Ethyl | S | ....do.... | 1.5778 |
| 19 | i-Propyl | ....do.... | S | 2,4,5-trichlorophenyl | 1.5712 |
| 20 | n-Propyl | Ethoxy | S | ....do.... | 1.5504 |
| 21 | ....do.... | ....do.... | S | ....do.... | 1.5582 |

* No. 1 prepared in the example.

Pre-emergence herbicide test.—The seeds of crab grass, annual bluegrass, watergrass, pigweed, Indian mustard and curly dock are planted in individual rows one-half inch deep in Santa Cruz sandy loam soil contained in compressed paper flats 8¼" x 6½" which are 2¾" deep. Enough seeds are planted to give about thirty to fifty plants of each of the weed species in each flat. The flats are watered after planting. The following day each flat is sprayed at the rate of 20 pounds of the candidate compound under test in 80 gallons of solution per acre. An atomizer is used to spray the solution on the soil surface. The flats are placed in a greenhouse at 80° F. and watered regularly. Two weeks later the degree of weed control is determined by comparing the amount of germination and growth of each weed in the treated flats with weeds in several untreated control flats. The results of this test are reported in Table II.

TABLE II.—PRE-EMERGENCE ACTIVITY RATE, 20 LBS./A

| Compound No. | Crab grass | Annual bluegrass | Water grass | Pigweed | Indian mustard | Curly dock |
|---|---|---|---|---|---|---|
| 1 | +++ | +++ | +++ | +++ | +++ | +++ |
| 2 | +++ | +++ | +++ | +++ | +++ | +++ |
| 3 | +++ | +++ | +++ | +++ | +++ | + |
| 4 | +++ | + | +++ | +++ | +++ | +++ |
| 5 | +++ | ++ | +++ | +++ | +++ | ++ |
| 6 | +++ | +++ | +++ | +++ | +++ | +++ |
| 10 | + | − | ++ | +++ | +++ | + |
| 11 | − | − | − | +++ | ++ | − |
| 12 | − | − | − | +++ | ++ | − |
| 16 | +++ | ++ | +++ | +++ | +++ | +++ |
| 17 | +++ | +++ | +++ | +++ | +++ | +++ |

+ = Slight injury.
++ = Moderate injury.
+++ = Severe injury or death.

Post-emergence herbicide test.—The seeds of five weed species, crab grass, watergrass, red oats, curly dock, Indian mustard, and one crop Pinto beans (*Phaseolus vulgaris*) are planted in individual rows as described in the pre-emergence test, supra. Two weeks after planting the plant foliage is sprayed with a 0.5% solution of the test compounds at a rate equivalent to 12.5 pounds/acre. The treated plants are placed back in the greenhouse. Injury ratings are recorded 14 days after treatment. The rating system is the same as that used in the pre-emergence test. Table III lists the results obtained therefrom.

TABLE III.—POST-EMERGENCE ACTIVITY RATE, 12.5 LBS./A

| Compound No. | Crab grass | Water grass | Red Oats | Curly dock | Indian mustard | Pinto beans |
|---|---|---|---|---|---|---|
| 1 | − | ++ | + | +++ | +++ | +++ |
| 2 | +++ | +++ | + | +++ | +++ | +++ |
| 3 | − | − | +++ | +++ | +++ | − |
| 4 | ++ | − | − | − | +++ | +++ |
| 5 | +++ | +++ | + | − | +++ | +++ |
| 6 | +++ | +++ | ++ | ++ | +++ | +++ |
| 7 | ++ | + | − | − | +++ | +++ |
| 16 | ++ | − | − | +++ | − | +++ |
| 17 | +++ | + | − | +++ | +++ | +++ |

+ = Slight injury.
++ = Moderate injury.
+++ = Severe injury or death.

The new compounds of the present invention are used as pre-emergence or post-emergence herbicides and are applied in a variety of ways at various concentrations. In practice the compounds are formulated with an inert carrier, utilizing methods well-known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre. One particularly advantageous way of applying the compound is a narrow band along a row crop straddling the row. In practice the compounds are formulated with an inert carrier utilizing methods well known to those skilled in the art, thereby making them suitable for particular application.

The concentration of a compound of the present invention, constituting an effective amount in best mode of administration in the utility disclosed is readily determinable by those skilled in the art. Various changes and modifications are possible without departing from the spirit and scope of the invention described herein and will be apparent to those skilled in the art to which it pertains.

What is claimed is:

1. Compounds corresponding to the formula

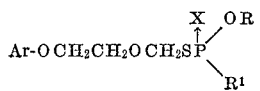

wherein X is selected from the group consisting of oxygen and sulfur, R is lower alkyl, $R^1$ is selected from the group consisting of lower alkyl and lower alkoxy and Ar is selected from the group consisting of nuclear polychlorinatedphenyl and naphthyl groups, wherein said nuclear polychlorination is from 2 to 5 chlorine atoms, inclusive.

2. The compound according to claim 1 in which X is sulfur, R is ethyl, $R^1$ is ethoxy, Ar is 2,4-dichlorophenyl.

3. The compound according to claim 1 in which X is sulfur, R is methyl, $R^1$ is methoxy, Ar is pentachlorophenyl.

4. The compound according to claim 1 in which X is sulfur, R is methyl, $R^1$ is methoxy, Ar is β-naphthyl.

5. The compound according to claim 1 in which X is oxygen, R is ethyl, $R^1$ is ethoxy, Ar is 2,4,5-trichlorophenyl.

6. The compound according to claim 1 in which X is oxygen, R is ethyl, $R^1$ is ethoxy, Ar is 2,4-dichlorophenyl.

7. The compound according to claim 1 in which X is sulfur, R is i-propyl, $R^1$ is ethyl, Ar is 2,4,5-trichlorophenyl.

References Cited

UNITED STATES PATENTS

| | | | |
|---|---|---|---|
| 3,246,052 | 4/1966 | Guarnaccio | 260—951 |
| 3,368,002 | 2/1968 | Szabo et al. | 260—951 |

CHARLES B. PARKER, Primary Examiner

RICHARD L. RAYMOND, Assistant Examiner

U.S. Cl. X.R.

71—2.3; 260—953, 968